United States Patent

Maccario

[11] Patent Number: 6,092,558
[45] Date of Patent: Jul. 25, 2000

[54] DETECTABILITY OF BURIED ELONGATED OBJECTS SUCH AS PIPES, DUCTS AND CONDUITS

[76] Inventor: Floriano A. Maccario, #802 - 10155 - 114 Street, Edmonton, Alberta, Canada, T5K 1R8

[21] Appl. No.: 09/058,288

[22] Filed: Apr. 10, 1998

[30] Foreign Application Priority Data

Feb. 19, 1998 [CA] Canada .................................... 2230042

[51] Int. Cl.$^7$ ........................................................ F16L 9/00
[52] U.S. Cl. .......................... 138/178; 138/104; 138/177; 116/209; 405/157
[58] Field of Search ..................................... 138/104, 177, 138/178; 116/201, 204, 209, DIG. 14; 405/157, 154

[56] References Cited

U.S. PATENT DOCUMENTS

| Re. 34,701 | 8/1994 | Goodman | 156/244.1 |
|---|---|---|---|
| 3,367,370 | 2/1968 | Sherlock | 138/104 |
| 3,382,493 | 5/1968 | Loper, Jr. et al. | 340/244 |
| 3,633,533 | 1/1972 | Allen | 116/201 |
| 5,017,873 | 5/1991 | Rippingale et al. | 138/104 X |
| 5,036,210 | 7/1991 | Goodman | 138/104 X |
| 5,051,034 | 9/1991 | Goodman | 138/104 X |
| 5,114,517 | 5/1992 | Rippinggale et al. | 156/187 |
| 5,243,128 | 9/1993 | Marcoz | 138/104 X |

FOREIGN PATENT DOCUMENTS 2832547  2/1980  Germany .................................. 138/104

*Primary Examiner*—Patrick Brinson
*Attorney, Agent, or Firm*—Jones, Tullar & Cooper, P.C.

[57] ABSTRACT

A method of achieving improved delectability of pipe, duct or conduit buried below the surface of the earth involves providing the pipe, duct or conduit with a plurality of very small high energy permanent magnetic elements spaced apart along the length thereof. Preferably the elements will be positioned within a groove, or grooves, formed in the external surface of the pipe, duct or conduit, and they will be covered by a protective tape to avoid inadvertent mechanical removal and to avoid contamination once the pipe, duct or conduit has been buried. For plastic pipe there should be a projection extending inwardly of the interior of the pipe adjacent the groove so as to ensure that the wall thickness of the pipe is maintained. A pipe carrying a single longitudinally extending groove should be positioned in the ground with the groove uppermost for maximum flow of gaseous material within the pipe. If the pipe is provided with a pair of diametrically opposed grooves then the pipe should be buried with the grooves generally parallel to the surface of the ground. A pipe, duct or conduit provided with the magnetic elements of the present invention, which can measure in the order of 1.2 mm thick, 6.5 mm wide, and 10 cm long, is easily detectable by a standard gradiometer at a depth of 1.2 m.

11 Claims, 4 Drawing Sheets

DETECTABILITY OF BURIED ELONGATED OBJECTS SUCH AS PIPES, DUCTS AND CONDUITS

The present invention relates to a method for detecting underground non-magnetic, non-conductive elongated objects such as pipes, ducts and conduits, to a method for preparing these items for later detection after burial, and to a treated pipe, duct or conduit that can be easily detected.

BACKGROUND OF THE INVENTION

There are various elongated non-magnetic, non-conductive items, such as ducts, cable-carrying conduits or plastic carriers of liquids and gases, mainly natural gas pipelines, that are buried a short distance below the surface of the earth. These items, once buried, are difficult to detect without having an exact plan of the area in which they are buried, with reference to existing structures or points. After many years, such reference structures or points may have been destroyed or the plans may be lost and it then is almost impossible to locate the buried items if required, as for replacement or repair. The problem is not particularly present with magnetic items or items that can carry an electrical current. There are many systems available for the detection of such buried items.

There are also different methods in place for the detection of non-magnetic or non-conductive pipes or cables, including those described in U.S. Pat. Nos. 5,036,210; 5,051,034; and RE34,701 of Goodman or the U.S. Pat. Nos. 5,006,806; 5,017,873 and 5,114,517 of Rippingdale et al. The inventions of Goodman and Rippingdale et al provide the pipe, usually of a plastic material, with strips, either continuous or discontinuous, of a permanently magnetized material so that the magnetic field associated with such strips can be detected by a suitable detector, such as a gradiometer, moving across the surface of the earth in the vicinity of the buried item. As an alternative to providing magnetic strips on the buried item Goodman, for example, suggests extruding a pipe with magnetic particles mixed into the plastic material used for the pipe prior to extrusion of the pipe so that the magnetic particles are uniformly dispersed throughout the pipe after it has cured. The pipe can then be subjected to a high strength magnetic field so that the particles become permanently magnetized and thereafter have a magnetic field permanently associated therewith.

The methods and products provided by Goodman and Rippingdale et al will work adequately, but the cost of manufacture is high and in some cases prohibitive, as in the case of coiled plastic pipes and conduits, which are of relatively small diameter. There is therefore a need for an improved method of magnetic detection, one which allows for new manufacture of pipes, ducts and conduits ready for burial and later detection, and which also allows for their preparation after manufacture with a magnetically detectable material associated therewith.

SUMMARY OF THE INVENTION

The present invention overcomes the problems associated with the prior art methods of underground pipe, duct or conduit detection, in particular the problems associated with the existing methods and products of Goodman and Rippingdale et al. With the present invention a plurality of narrow, thin and short lengths or elements of high energy magnetic material are located along the length of extruded pipe for example generally at the lateral equator thereof, which elements may measure about 6.5 mm in width, about 1.2 mm in thickness and about 10 cm in length. These pieces may be spaced apart about by distances of about 1.2 m and still provide adequate detectability with a standard gradiometer as used by utility companies. The elements may be secured to the cylindrical outer surface of the pipe, duct or conduit during manufacture or thereafter and they may also be covered by a protective tape to prevent inadvertent removal during handling. Preferably, especially with magnetic elements for plastic pipe, the pipe is provided with a longitudinally extending groove in the outer surface thereof into which the elements may be placed, pressed, and covered by a length of tape for protection. If this construction is utilized, then the interior of the pipe will have to be provided with a mating projection in order to maintain a constant thickness of the pipe throughout its circumference, so as to meet all standards established by regulatory agencies in various countries, states, or provinces.

The high energy magnetic material should be available commercially. If it comes in widths that are greater than that required to achieve full detectability it can be sliced into narrower widths before being applied to the exterior surface of the pipe, duct or conduit. The magnetic elements are preferably applied to the exterior of the pipe, duct or conduit during the extrusion process while the pipe, duct or conduit is being made. Since the magnetic material is itself very highly magnetized there is no need to subject the material, either before or after application thereof to a pipe, duct or conduit, to any other magnetic fields. It is expected that pipe, duct or conduit that has been constructed in accordance with this invention should be detectable at depths of 1.2 meters or more for 50 years or more.

DESCRIPTION OF THE PREFERRED EMBODIMENT

In the discussion hereinbelow the term "pipe" will be used to designate non-magnetic, non-conductive pipe, duct or conduit. Such pipe, duct or conduit would be expected to carry fluids (either gaseous or liquid) or else the pipe, duct or conduit could be used to carry non-magnetic, non-conductive items such as fibre-optic cable.

Figure 1:
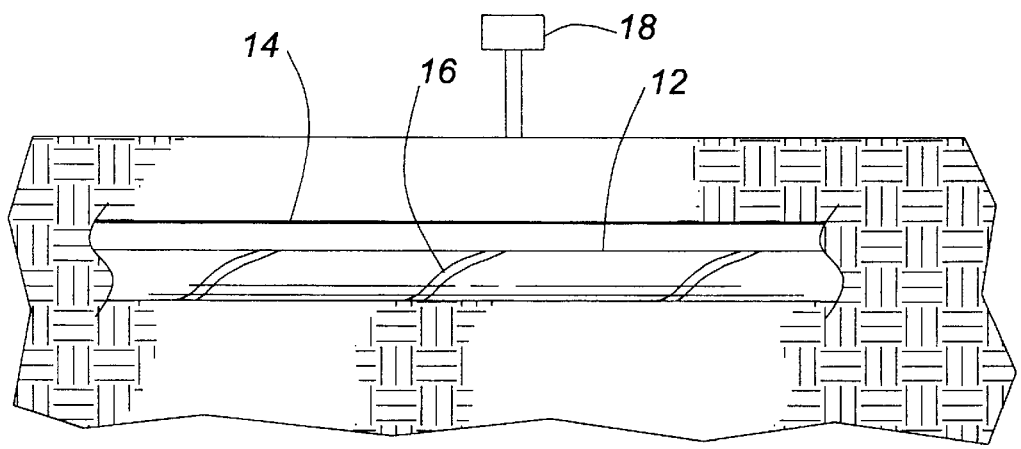
FIG. 1 illustrates schematically a pipe buried in the ground with a detector in close proximity thereto.

FIG. 1 of the drawings illustrates a situation in which a small diameter pipe 12 is buried in the earth to a depth of about four feet (1.2 m). The pipe could carry natural gas or be a conduit for fibre optic, electrical or telecommunication cables or the like. In any event, it is not possible using standard, known detection techniques, to locate the pipe from the surface of the earth. One would have to dig to the expected depth of the pipe in the area in which one suspects that the pipe might be buried in order to hopefully locate the pipe. With prior art detection techniques an electrically conductive tracer wire 14 has been buried adjacent the pipe, or magnetic strips 16 have been adhered to the pipe, usually in a spiral manner, for detection by suitable apparatus 18 which is moved over the surface of the earth in the general area in which one expects the pipe to be buried. Electrical or magnetic fields are detected by the apparatus 18, so that when digging commences there is a high expectation that the pipe will be found quickly. The same considerations and problems apply when one is looking for other types of buried non-conductive items, such as small diameter conduits carrying fiber optic cables.

Figure 2:
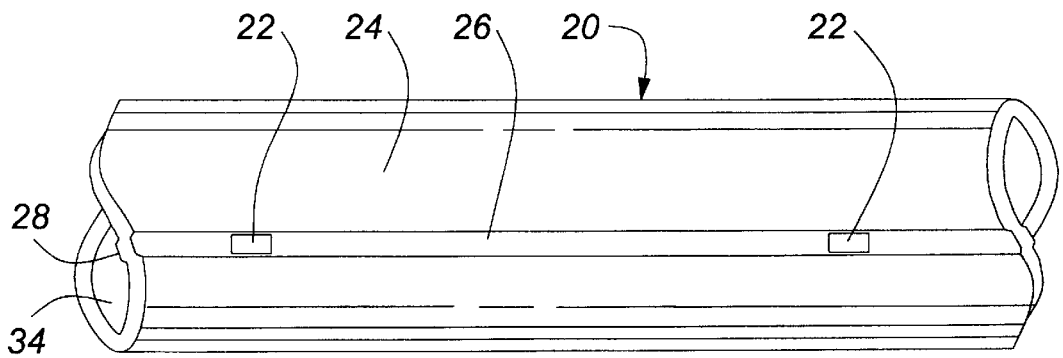
FIG. 2 illustrates a length of pipe having at least one groove therein with high energy magnetic elements spaced apart therealong.
Figure 3:
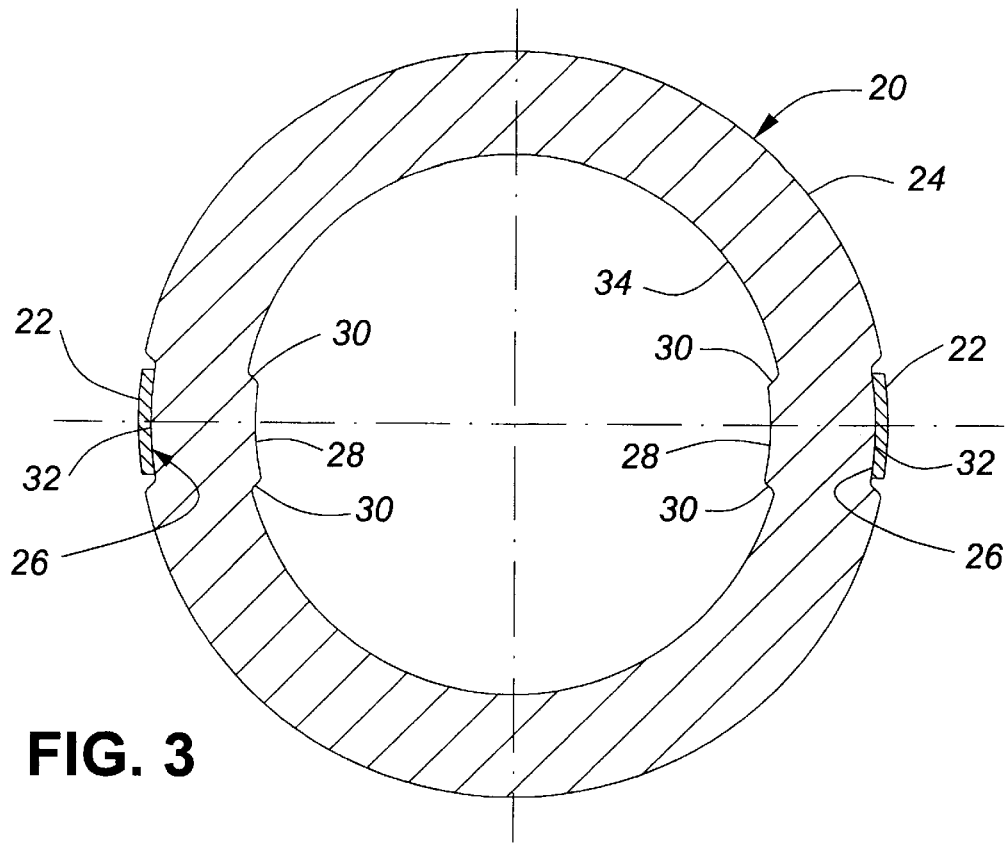
FIG. 3 illustrates, in cross-section, a pipe having a pair of laterally positioned grooves with high energy magnetic elements in each groove.
Figure 4:
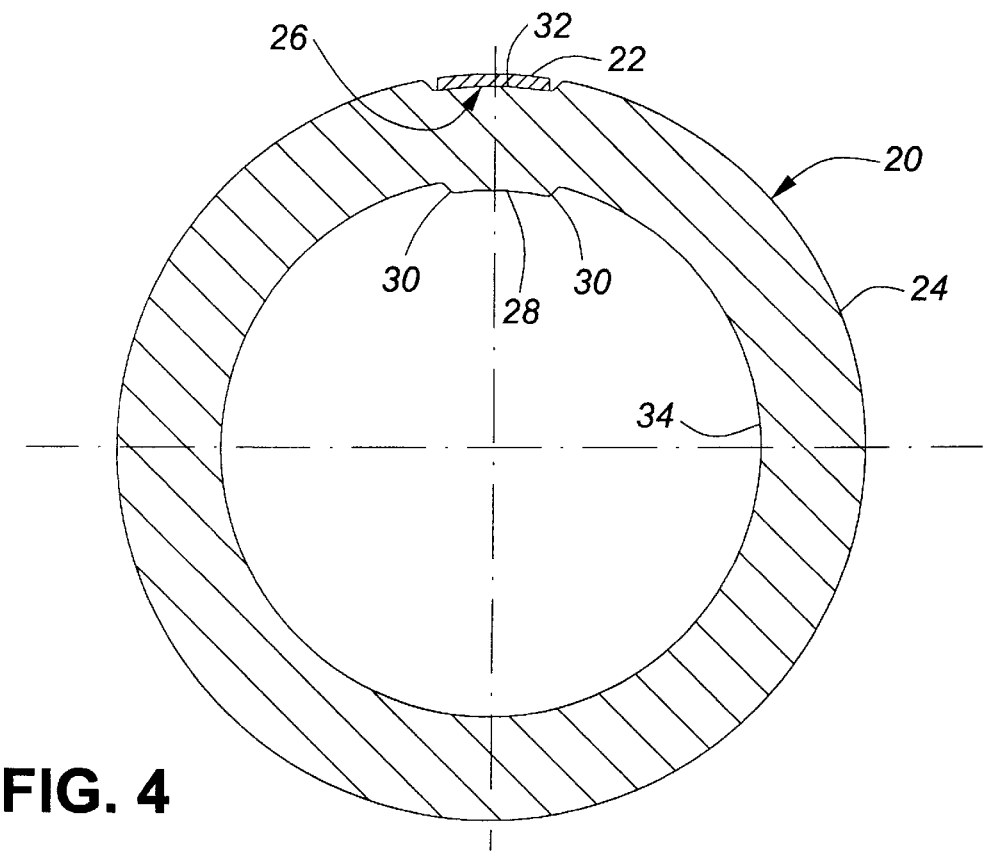
FIG. 4 illustrates, in cross-section, a pipe having a single longitudinally extending groove with high energy magnetic elements in the groove.

The problems associated with prior art detection methods and products are overcome by the present invention. With reference to FIGS. 2, 3 and 4 it will be seen that with the present invention the pipe, duct or conduit 20 is provided with a plurality of spaced apart high energy magnetic elements 22 along the length thereof, which elements are very thin, narrow and short. These elements can be adhered or otherwise secured to the surface 24 of the pipe or conduit, but preferably the pipe or conduit is provided with at least one longitudinally extending groove 26 in the outer surface thereof, which groove then contains the spaced apart elements 22. Since the elements 22 are extremely thin and narrow the grooves 26 also can be very shallow and narrow.

Since it is important that the wall thickness of a pipe be maintained constant over the circumference thereof in order to avoid radial failure it is necessary to have the wall of the pipe intrude inwardly, as by way of a small projection 28 which mirrors the groove 26 and has curved smooth fillets 30 at the longitudinal edges thereof to ensure non-turbulent flow of fluids along the pipe. The grooves 26 and the corresponding inward projections can be formed by the extrusion die at the time that the pipe is extruded as will become more apparent hereinafter.

As seen in FIGS. 2 and 3 the present invention utilizes a plurality of magnetic elements 22 spaced apart along the length of a pipe, duct or conduit. The magnetic elements are very small in size, having a thickness of about 1.2 mm, a width of about 6.5 mm, and a length of about 10 cm. The magnetic elements are spaced apart by about 1.2 m. For manufacturing purposes the magnetic elements can be cut from a flexible strip of magnetic material such as catalogue number 4970 available from Jobmaster Magnet Canada Inc. of Mississauga, Ontario, Canada. Such a strip comes in a width of about 19.5 mm and can be cut longitudinally into three sections of the appropriate width. The flexible strip has adhesive on one surface, one pole per face, and a nominal flux density of 1.4 milligauss. When magnetic elements of the indicated size are applied to pipe, even in only a single line, the pipe can be detected quite easily at a buried depth of 1.2 m.

FIGS. 3 and 4 show two preferred embodiments of a pipe constructed in accordance with the present invention. Therein it is seen that the pipe 20 is provided with two grooves 26 (FIG. 3) or one groove 26 (FIG. 4) in the outer surface 24 thereof. Each groove follows the contour of the pipe in that the arcuate inner surface 32 of the groove is parallel to the outer surface 24. At the upper and lower longitudinal edges of the groove there is a smooth transition to the outer surface 24. Since the width of a magnetic element 22 that is to be contained within a groove 26 is very small, on the order of 6.5 mm, and since the thickness of such an element is also very small, on the order of 1.2 mm, it will be appreciated that the depth and width of a groove 26 are also very small and that the intrusion of a groove into the outer surface of a pipe is very slight. Notwithstanding that fact it is necessary to compensate inwardly of a pipe for the intrusion of the groove into the wall thickness, whereby the wall thickness is maintained throughout the circumference of the pipe, to meet all standards imposed by various regulatory agencies. That means that the pipe also has an inwardly directed projection 28 along the inner surface 34 thereof. In order to ensure that the flow of fluid within the pipe is as streamlined as possible the projection is provided with smooth fillets 30 along the top and bottom longitudinal edges thereof. The projection mirrors the groove opposite so that the wall thickness of the pipe is not adversely affected by the presence of the groove. The two tables provided below show the percentage reduction in internal area for common sizes of pipe when provided with two grooves (FIG. 3) or a single groove (FIG. 4).

TABLE 1

| Nominal Pipe Size (in.) | Nominal Size Dia. (mm) | Minimum Wall Thickness (mm) | Minimum Thickness × 2 (mm) | Internal Diameter (mm) | Internal Area (mm$^2$) | Magnet Area Detraction (mm$^2$) | Real Internal Area (mm$^2$) | % Reduction In Area |
|---|---|---|---|---|---|---|---|---|
| ¾ | 26.7 | 2.42 | 4.84 | 21.86 | 375.8 | 14.0 | 361.8 | 3.72 |
| 1 | 33.4 | 3.04 | 6.08 | 27.32 | 585.9 | 14.0 | 571.9 | 2.38 |
| 1¼ | 42.2 | 3.82 | 7.64 | 34.56 | 1194.4 | 14.0 | 1180.4 | 1.18 |
| 1½ | 48.3 | 4.38 | 8.76 | 39.54 | 1227.3 | 14.0 | 1213.3 | 1.15 |
| 2 | 60.3 | 5.48 | 10.96 | 49.34 | 1911.3 | 14.0 | 1897.3 | 0.73 |

TABLE 1-continued

| Nominal Pipe Size (in.) | Nominal Size Dia. (mm) | Minimum Wall Thickness (mm) | Minimum Thickness × 2 (mm) | Internal Diameter (mm) | Internal Area (mm$^2$) | Magnet Area Detraction (mm$^2$) | Real Internal Area (mm$^2$) | % Reduction In Area |
|---|---|---|---|---|---|---|---|---|
| 2½ | 73.0 | 6.62 | 13.24 | 59.76 | 2803.4 | 14.0 | 2789.4 | 0.50 |
| 3 | 88.9 | 8.08 | 16.16 | 72.74 | 5291.1 | 14.0 | 5271.1 | 0.26 |
| 4 | 114.3 | 10.38 | 20.72 | 93.58 | 6874.4 | 14.0 | 6860.4 | 0.20 |
| 6 | 168.3 | 15.28 | 30.56 | 137.74 | 14893.3 | 14.0 | 14879.3 | 0.01 |

TABLE 2

| Nominal Pipe Size (in.) | Nominal Size Dia. (mm) | Minimum Wall Thickness (mm) | Internal Diameter (mm) | Internal Area (mm$^2$) | Magnet Area Detraction (mm$^2$) | Real Internal Area In Area | % Reduction |
|---|---|---|---|---|---|---|---|
| ¾ | 26.7 | 2.42 | 21.86 | 375.8 | 7.0 | 368.8 | 1.86 |
| 1 | 33.4 | 3.04 | 27.32 | 585.9 | 7.0 | 578.9 | 1.19 |
| 1¼ | 42.2 | 3.82 | 34.56 | 1194.4 | 7.0 | 1187.4 | 0.59 |
| 1½ | 48.3 | 4.38 | 39.54 | 1227.3 | 7.0 | 1220.3 | 0.57 |
| 2 | 60.3 | 5.48 | 49.34 | 1911.3 | 7.0 | 1904.3 | 0.37 |
| 2½ | 73.0 | 6.62 | 59.76 | 2803.4 | 7.0 | 2796.4 | 0.25 |
| 3 | 88.9 | 8.08 | 72.74 | 5291.1 | 7.0 | 5284.1 | 0.13 |
| 4 | 114.3 | 10.38 | 93.58 | 6874.4 | 7.0 | 6867.4 | 0.10 |
| 6 | 168.3 | 15.28 | 137.74 | 14893.3 | 7.0 | 14886.3 | 0.005 |

As is seen from the above tables there is a very small reduction in the area of a pipe due to the presence of the projection or projections within the interior of the pipe. Any decrease in flow rate attributable to the projection or projections is minimal and will not have an adverse effect in the long run. Of course, the reduction, and any adverse effect, is least when the pipe is provided with only one groove 26 and corresponding projection 28.

Figure 5:
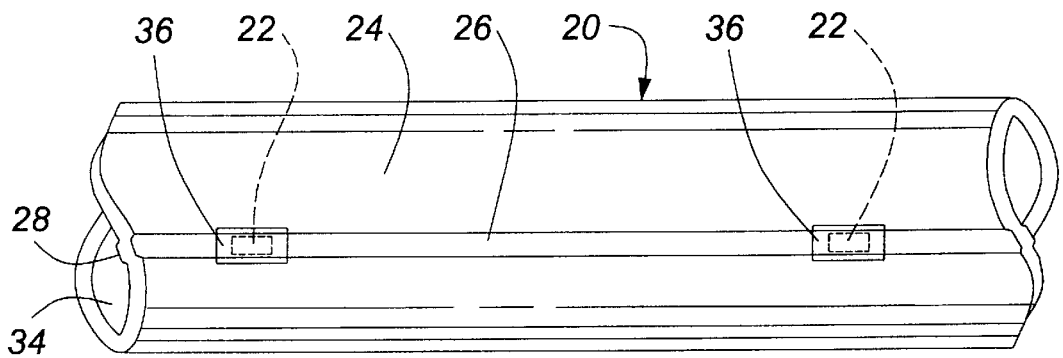
FIG. 5 illustrates a length of pipe having magnetic elements thereon with the elements being covered by a strip of protective tape.

FIG. 5 illustrates a further modification to the present invention, namely the application of a length 36 of protective tape over the element 22 of magnetic material. The tape extends beyond the edges of the element 22 and protects those edges from catching on any equipment or machinery that might be used to apply the magnetic elements to the pipe, to coil the pipe after manufacture, or to facilitate the burying of the pipe in the ground. Tape 36 can be utilized in either embodiment of the invention, whether the magnetic elements are applied directly to the exterior or outer surface of the pipe or whether the elements are located within a groove 26 provided in the outer surface of the pipe. The protective tape also provides a barrier against moisture, dirt and contaminants that might adversely affect the performance of the magnetic material over a long period of time. A commercially available tape that meets the requirements of the present invention is produced by the 3M Company and is identified by catalogue number 3939.

Figure 6:
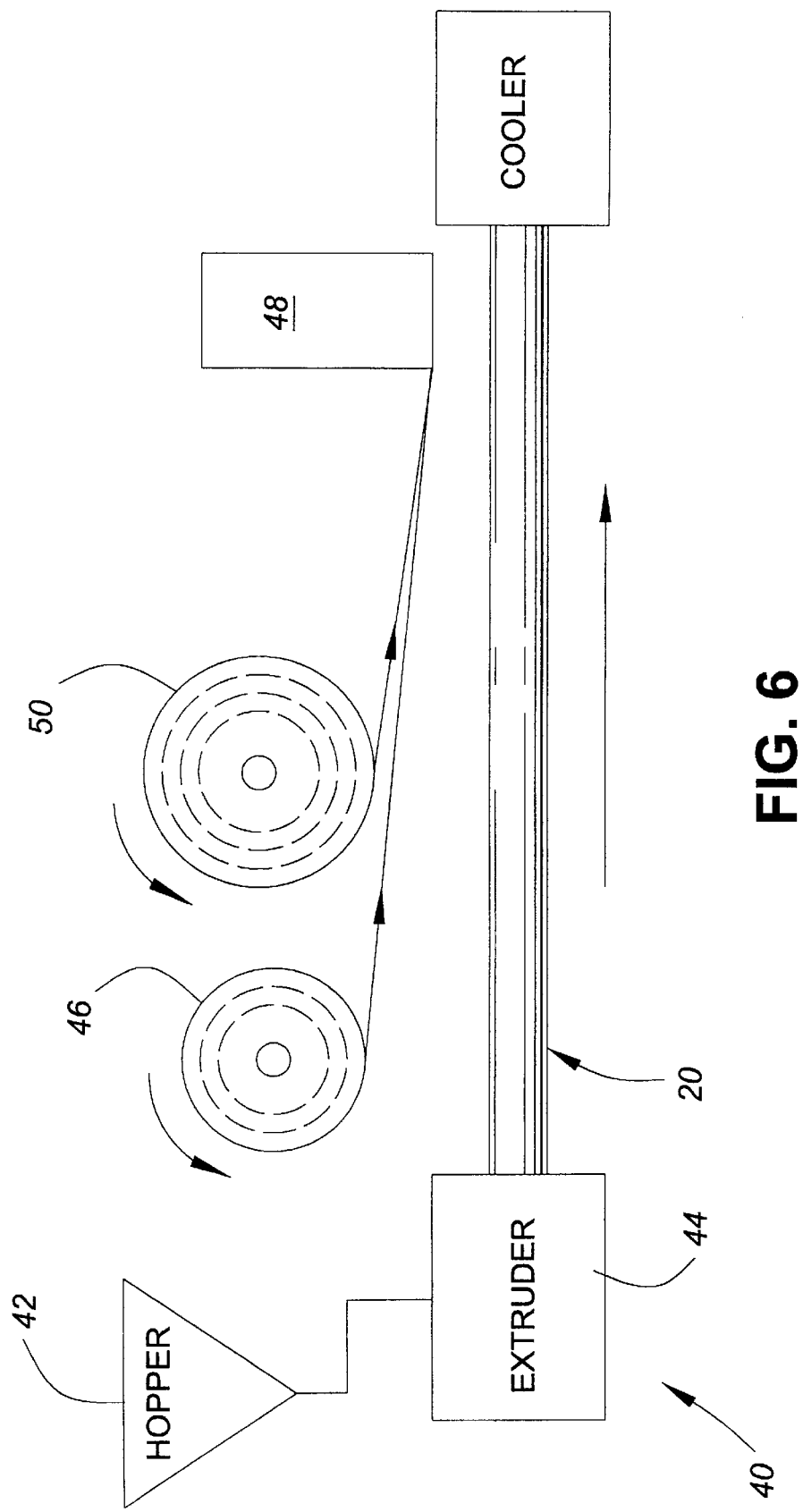
FIG. 6 illustrates schematically the apparatus and method for forming pipe and cable at a manufacturing plant in accordance with the present invention.

FIG. 6 illustrates schematically a manufacturing apparatus and process that could be used to produce pipe or cable provided with magnetic elements as described hereinabove. The apparatus includes an extrusion section 40 which entails a hopper 42 for feeding raw material to an extrusion die 44. The die 44 will form the hollow cylindrical pipe 20 with one or two longitudinally extending grooves 26 in the outer surface and one or two corresponding projections 28 on the inner surface. As the pipe leaves the extrusion die and starts to cool the elements of magnetic material can be pressed into the grooves and adhered to the surface of the pipe therein. The magnetic material is provided in roll form as a supply 46, with the material leading to an application station 48 where it is cut into short lengths and applied to the pipe. If it is desired that the magnetic elements be covered by a protective tape the tape may be provided in roll form as a supply 50 adjacent the pipe and the magnetic material so that it also can be applied to the exterior of the pipe at the station 48, covering the element as it is applied at that station. Although it is more economical to cut the tape so that it just covers an individual magnetic element, additional and more complete protection could be achieved if the tape is applied as a continuous length, covering the groove along the entire length thereof, and of course covering and protecting the magnetic elements that are spaced apart along the pipe. If the tape is cut to cover the magnets only, then the rest of the groove, between the magnetic elements, could be filled with adhesive or the plastic material of the pipe in order to maintain a reasonably smooth outer cylindrical surface. This can be of some importance when the pipe is to be coiled after manufacture. Also, it is somewhat important to have the ends of the pipe section reasonably cylindrical in order to achieve proper, sealed coupling of one pipe end to the mating end of another pipe, as by way of short coupling members.

If the elements are to be applied to the outer surface of the pipe or conduit, without the benefit of a groove, the above apparatus could still be used, the only difference being that the extrusion die would not be shaped to form a groove and corresponding projection. The magnetic elements and the protective tape can be applied in exactly the same manner as described above.

When a pipe, duct or conduit provided with spaced apart elements of high energy magnetic material as described herein is buried in the ground a magnetic field is defined by the magnetic elements, the flux lines of which approach the surface of the ground. An operator using a suitable detector, such as a gradiometer, would be able to detect the magnetic field and realize that a pipe or cable having the magnetic elements thereon is below the detector. A suitable detector would be the Model GA-52Cx Magnetic Locator sold by Schonstadt Instrument Company of Reston, Va., USA. Such a detector will easily detect at about three feet (1 m) a magnetic field having a strength of between 0.6 and 1 milligauss (60 to 100 gamma), which filed strength is easily attainable with the magnetic elements used with this invention. Most pipes, ducts or conduits are not buried at a depth much greater than three to four feet (1 to 1.2 m) below the surface of the earth.

When the embodiment of FIG. 3 is utilized it is preferred that the magnetic elements be located along the equator of the pipe so that they will be generally horizontally opposed when the pipe is laid in the ground. When the embodiment of FIG. 4 is utilized it is preferred that the groove 26 and the magnetic elements 22 therein be positioned at the top of the pipe so that they are uppermost and as close to the surface of the ground as possible. This orientation is shown in FIGS. 4 and 7.

Figure 7:
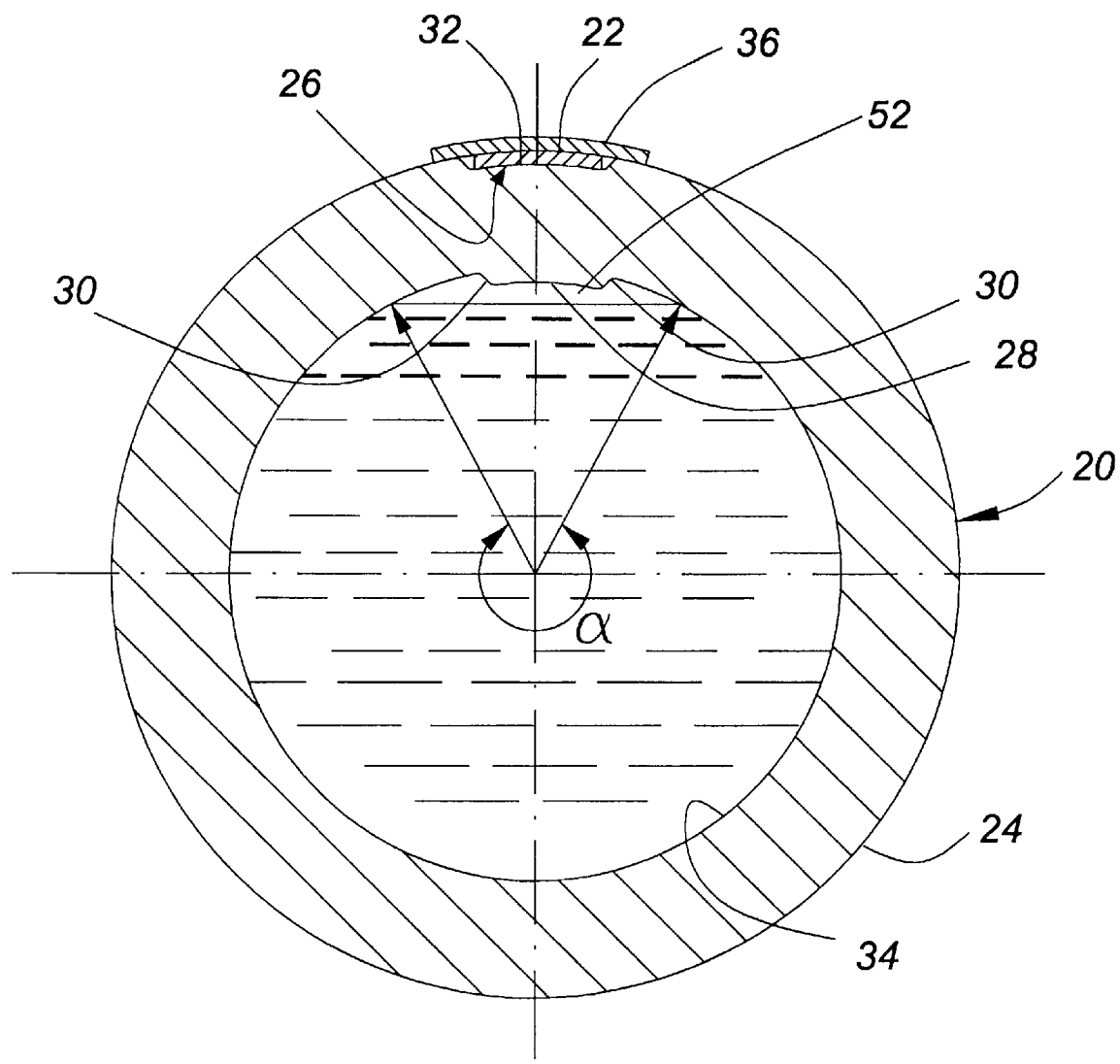
FIG. 7 illustrates in cross-section a pipe having a strip of magnetic material in a groove thereof, with an indication of how the pipe would carry fluid for maximum flow.

It is believed that a pipe provided with a single groove 26 and mating inwardly directed projection 28 and oriented as seen if FIG. 7 will actually improve the flow of fluids (gaseous or liquid) within the pipe. This is shown in a rigorous analytical examination of flow within a plastic pipe, the result of which indicates that the maximum flow, in cc/sec, is achieved when the fluid does not occupy the entire internal cross-sectional area of the pipe. The maximum flow for uniform streams within the pressure range in which plastic pipe is utilized actually takes place when the angle shown in FIG. 7 is in the order of 310°, leaving a small zone 52 at the top of the pipe interior which is free of fluid. The projection 28 easily fits within or occupies that free zone, meaning that the provision of the groove and mating projection do not detrimentally affect the flow of fluid within the pipe. For the sake of interest, the aforementioned flow examination revealed that the maximum velocity occurs when the angle is in the order of 257°.

The present invention is an improvement over pipes or cables which have elongated strips of permanent magnetic material applied thereto or which are extruded from plastic material having magnetic particles mixed therewith. In particular the cost per unit length of a pipe or conduit provided with the magnetic elements of this invention is considerably less than the cost of prior art systems. Of course it is possible that a skilled person could modify the apparatus or method of this invention without departing from the spirit thereof. For example it would be possible to apply magnetic elements as described herein to other types of non-conductive items, such as plastic anchors or tubular container for later detection using a gradiometer or a magnetometer, on the basis of the principles of this invention. Accordingly the protection to be afforded this invention is to be determined from the claims appended hereto.

I claim:

1. A method of manufacturing a cylindrical, non-magnetic elongated pipe that can be detected by a magnetic field detection device when said pipe is otherwise hidden from view, comprising the steps of: extruding a continuous length of hollow pipe having an annular wall of constant, uniform thickness whereby the wall is provided with at least one longitudinally extending groove in the exterior surface thereof and a corresponding inwardly directed projection at the interior surface thereof aligned with said at least one groove to maintain said constant wall thickness along the length of said pipe; and fixing a plurality of elements of high strength magnetic material within said at least one groove, said elements being spaced apart longitudinally along said at least one groove.

2. The method of claim 1 wherein said elements are fixed within said at least one groove as said pipe is being extruded.

3. The method of claim 2 including the step of covering said elements by corresponding lengths of protective tape.

4. The method of claim 2 including the step of covering said at least one groove and the elements fixed therein by a length of protective tape.

5. The method of claim 2 including the step of filling said at least one groove between adjacent spaced apart elements with material from which said pipe is being made.

6. The method of claim 1 including the step of extruding two diametrically opposed grooves and corresponding inwardly directed projections in said pipe, and of fixing said elements of magnetic material within each of said grooves.

7. An elongated generally cylindrical, non-magnetic pipe for burying in the ground, said pipe being detectable, when so buried, by a magnetic field detection device, said pipe having: an annular wall with at least one longitudinally extending groove in the exterior surface thereof; a corresponding inwardly directed projection at the interior surface of said wall aligned with said at least one groove, sized to maintain a constant, uniform wall thickness along the length of said pipe; and a plurality of elements of high strength magnetic material fixed within said at least one groove and spaced apart along the length of said pipe.

8. The pipe of claim 7 including another groove and projection in said exterior and interior surfaces respectively, diametrically opposed to said at least one groove and corresponding projection, with additional elements of the magnetic material fixed within said another groove at locations spaced apart therealong.

9. The pipe of claim 7 wherein said elements are covered by individual lengths of protective tape.

10. The pipe of claim 7 wherein said elements and said at least one groove are covered by a length of protective tape.

11. The pipe of claim 7 including smooth fillets joining the longitudinal edges of said projection to the interior surface of said pipe wall.

* * * * *